Figure 1:
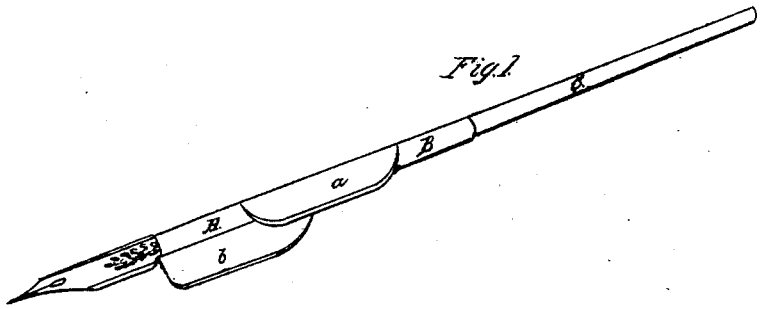
Figure 2:
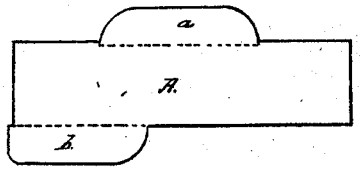
Figure 3:
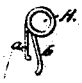
Figure 6:
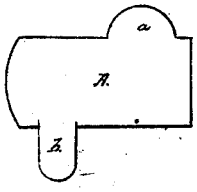
Figure 4:
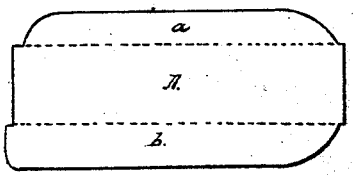
Figure 5:
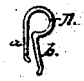

NO PRINTED SPECIFICATION AVAILABLE

E. W. Hanson.
Pen Holder.

No. 120. A. I. Patented Apr. 10, 1855.

764

Witnesses.
Edwd. S. Munn
Wm. Munn
2

Inventor.
E. W. Hanson.

A88